Patented Mar. 2, 1937

2,072,081

UNITED STATES PATENT OFFICE 2,072,081

PLASTIC HEAT INSULATING COMPOSITION

Oscar A. Brandt and Duluth Dalenius, Bellingham, Wash.

No Drawing. Application April 27, 1936, Serial No. 76,606

1 Claim. (Cl. 106—18)

The object of our invention is the production of a plastic, nonconducting, waterproof composition of matter of the character of cement to be applied to the surfaces of steam-boilers, steam-pipes, pulp-digesters, and other receptacles and conduits as a lagging for preventing the radiation of heat and the permeation of water.

Our composition consists of a mixture of blue clay, flax-seed meal, green tow, hemp waste and pulverized charcoal mixed together with waste sulphite liquor from paper pulp mills.

Green tow is the coarse, fibrous, waste product remaining after removing the finer, fibrous material from flax straw.

In preparing the composition we prefer to use the ingredients in about the following proportions—viz., about 40 pounds of blue clay, about 15 pounds of flax-seed meal, about 22 pounds of green tow, about 5 pounds of hemp waste, about 5 pounds of pulverized charcoal and about 10 gallons of waste sulphite liquor.

We claim,—

A plastic composition consisting of about 40 pounds of blue clay, about 15 pounds of flax-seed meal, about 22 pounds of green tow, about 5 pounds of hemp waste, about 5 pounds of pulverized charcoal and about 10 gallons of waste sulphite liquor.

OSCAR A. BRANDT.
DULUTH DALENIUS.